United States Patent [19]
Gamba

[11] Patent Number: 5,163,255
[45] Date of Patent: Nov. 17, 1992

[54] CONSTRUCTION SHIMS

[75] Inventor: Gregory Gamba, #4 Locust Pl., Livingston, N.J. 07039

[73] Assignee: Gregory Gamba, Livingston, N.J.

[21] Appl. No.: 709,784

[22] Filed: May 30, 1991

Related U.S. Application Data

[60] Continuation of Ser. No. 492,637, Mar. 13, 1990, abandoned, which is a division of Ser. No. 80,891, Jul. 31, 1987, Pat. No. 4,909,294.

[51] Int. Cl.⁵ ................................................ E04C 2/10
[52] U.S. Cl. ........................................ 52/98; 206/499
[58] Field of Search ............................ 52/574, 98–100; 206/499

[56] References Cited

U.S. PATENT DOCUMENTS

| | | | |
|---|---|---|---|
| 1,394,363 | 10/1921 | Scott | 206/499 |
| 2,018,712 | 10/1935 | Elmendorf | 428/537.1 |
| 2,019,095 | 10/1935 | Robinson | 52/98 |
| 2,771,107 | 11/1956 | Vasey | 144/193 J |
| 2,916,063 | 12/1959 | Boekenkamp | 144/136 R |
| 3,754,586 | 8/1973 | Daniels | 144/13 |
| 4,336,879 | 6/1982 | Carr | 52/98 |
| 4,909,294 | 3/1990 | Gamba | 144/136 R |

FOREIGN PATENT DOCUMENTS

| | | | |
|---|---|---|---|
| 342087 | 3/1919 | Fed. Rep. of Germany | 206/340 |
| 1050187 | 8/1953 | France | 144/193 D |
| 915952 | 1/1963 | United Kingdom | 206/340 |

*Primary Examiner*—James L. Ridgill, Jr.
*Attorney, Agent, or Firm*—Michael J. Ram

[57] ABSTRACT

A woodworking machine comprising one or more sets of parallel rotating blades position in or above a flat worktable surface such that multiple sets of parallel grooves of a controlled depth can be cut into a wood block moved over the table surface and above, below or between the rotating blades. The product produced by the machine is of a unitary construction comprised of multiple wedge shaped shims held together by a breakable membrane between the shims.

11 Claims, 7 Drawing Sheets

CONSTRUCTION SHIMS

This is a continuation of copending application(s) Ser. No. 07/492,637 filed on Mar. 13, 1990, now abandoned which is a divisional of Ser. No. 07/80,891 filed on Jul. 31, 1987, now U.S. Pat. No. 4,909,294, issued Mar. 20, 1990.

The invention relates to a woodworking machine for the simultaneous fabrication of multiple wedge shaped shims for use in the construction industry. The invention also includes the unique unitary structure of the multiple shims produced by the machine and the process for its operation.

In the construction industry during the installation of fixtures such as windows, doors, cabinets and the like it is desired that the fixtures be installed in a level and square position. To accomplish this a leveling shim or spacer is placed between the fixture and the surrounding support structure to hold the fixture in its desired confirmation prior to affixing and to act as a support once secured. In the past it has been necessary for the construction worker to fabricate the shim or spacer on the construction site from scrap materials available. A common source of such scrap materials was wooden shingles or shakes used for siding or roofing. However, these materials were not always available on the construction site or if available their use for shim purposes resulted in the generation of waste materials not suitable for shims, siding or roofing. Often it was necessary to purchase a supply of wooden shingles for use only as shims.

The prior art does not reveal any shims designed and produced solely for the purpose of leveling and squaring fixtures in the construction industry or, for that matter, machinery designed or adaptable for producing these shims. The prior art does disclose various different machines designed to make multiple cuts or grooves in wooden structures but these devices are of completely different construction and the end products produced bear no relationship to the shims discribed herein. U.S. Pat. No. 3,744,540 is directed to a machine composed of a series of mortising blades designed to cut notches in beams. A machine utilizing both horozontal and vertical blades for cutting wide notches in stringers of a pallet is described in U.S. Pat. No. 4,132,253. Simultaneous flattening and grooving of a log to produce material for the construction of a log cabin is covered in U.S. Pat. No. 4,167,961. U.S. Pat. No. 4,471,822 covers an easily adjustable machine for forming the sides for draws including shaping tools to round the edges and insert a groove for placement of the draw bottom.

SUMMARY OF THE INVENTION

The invention comprises a machine for simultaneously forming multiple wedge shaped shims and the shims, fabricated in a unitary structure, produced using the machine. In its simplest embodiment the machine consists of a flat work table and a single set of multiple parallel rotating blades mounted above the table or in the table with the axis of rotation of the blades being parallel with the table top and perpendicular to the edge of the table. The height of the cutting edges of the blades are adjusted so that the kerf left by the blade in a block of wood passed over the table top under or over the blade extends less than halfway into the block of wood. A second set of identically placed kerfs are made in the opposite side of the block followed by top and bottom sets of kerfs at an angle to and between the first set of parallel cuts. The resultant product is a unitary structure made up of several wedge shaped shims joined by a breakable membrane between each shim at the bottom of the kerf.

In a second alternative a cut is made only from one side with the kerf extending almost the full depth of the block. In this case the membrane, still at the bottom of the kerf, coincides with the outer edge of the block.

In a preferred form of the machine there are two pairs of parallel rotating blades. Each pair of blades comprises one set of blades mounted above the table and one set of blades mounted in the table but extending through the table top. The blades are all parallel and positioned so that top and bottom blades cut kerfs directly above and below each other leaving the breakable membrane between the kerfs. Slideable along the edge of a portion of the table top and past one pair of blades is an angled positioning shoe. In use a rectangular wooden block is slid across the table top parallel to the edge of the table and through the first set of rotating blades thus simultaneously cutting several grooves in the top and bottom of the block, the grooves being parallel to the edge of the block. The block is then placed against the angled positioning shoe and thereafter slid between the second set of rotating blades producing a second set of grooves in the top and bottom of the block, this second set of grooves being at an angle to as well as between the first set of parallel grooves. Since none of the cuts passes through the block or connects with any of the parallel cuts above or below it the resultant product is multiple wedge shaped shims held together by a thin breakable membrane of wood through the center of the block.

If desired the machine can also include a plane to size the block either before or after the cuts are made and a wrapping and labeling machine on the end thereof to continuously package the block of shims as they are fabricated. In the embodiment where all cuts are made in only one side of the block the packaging procedure is an important additional step which improves the appearance of the final product.

In an additional embodiment the grooves cut at an angle, rather then remaining between the first parallel grooves can pass over one or more of the first parallel grooves thus producing several shims both side by side and end to end.

DESCRIPTION OF THE PREFERRED EMBODIMENTS

Figure 1:
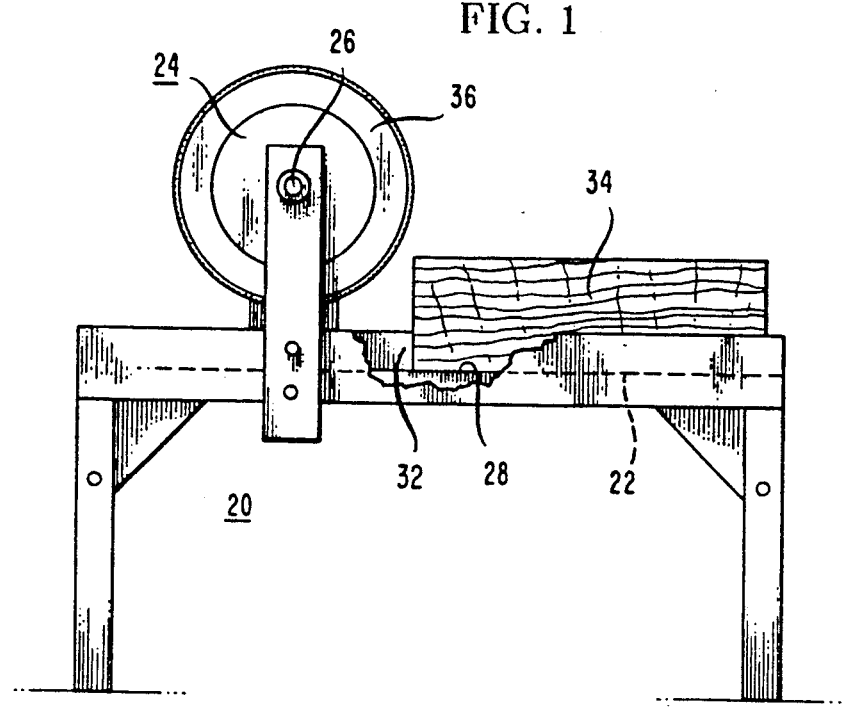
FIG. 1 is a side view of a machine incorporating a simple embodiment of the invention.
Figure 2:
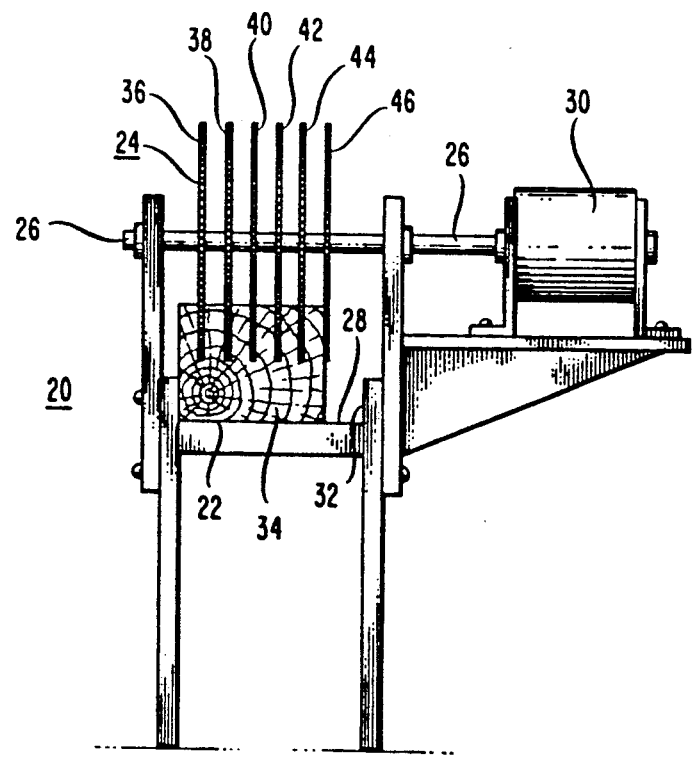
FIG. 2 is a front view of the shim fabricating machine of FIG. 1.

Referring to FIGS. 1 and 2, a simplified version of the shim fabricating machine 20 includes a flat surfaced table 22 and a series of blades 24 mounted parallel to each other on a single shaft 26, the shaft axis being parallel to the table top 28, said shaft being driven by a motor 30. Perpendicular to the table surface 22 are table sides 32 which help to align a rectangular block of wood 34 passing along the table top 28 and through the blades 24.

In the preferred simplified embodiment the shim fabricating machine 20 is sized to process one rectangular block of wood 34 at a time, the dimensions thereof being that of a standard 2×4 cut to 12 inch lengths (3½" wide by 1½" thick by 12" long). Such a machine has six blades 24, preferably 1/16" to ¼" in thickness, mounted on shaft 26 with the blades equally spaced so as to make five parallel cuts in block 34 with the left five blades 36, 38, 40, 42, and 44. The right most blade 46 passes along the outer right edge of the block 34 without making a cut. The height of the cutting edge 48 of the series of blades 24 is chosen to make cuts in the block of wood which are just short of one-half of the thickness of the block 34 passed through them. For example, if the block is 1½" thick the edge 48 of the blade would be set slightly greater than ¾" above the table top 28. While unnecessary for the first two parallel cuts, as will be further described hereinbelow, blade 46 is necessary for forming the diagonal cuts on block 34.

Power to drive the series of blades 24 is supplied by electrical motor 30 shown to be directly coupled to shaft 26. However, direct drive is not required and the shaft 26 can be driven by a belt, chain pulley or other comparable system as is common in wood shaping equipment.

Figure 3:
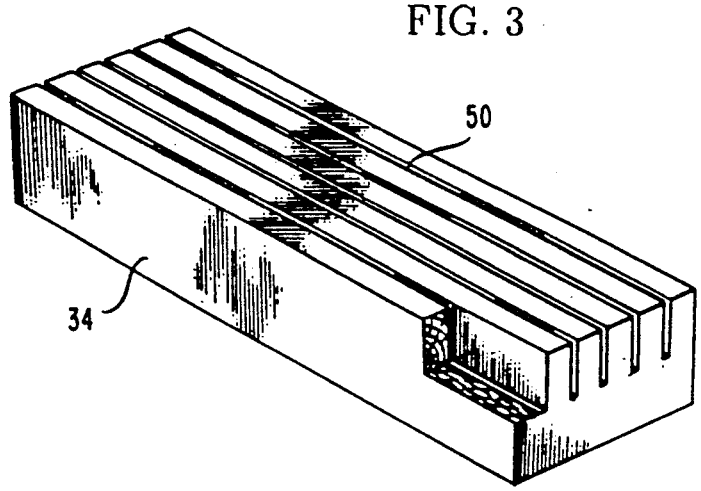
FIG. 3 is a perspective view of the shim block after the first pass through the machine of FIG. 1 and 2.

Utilizing the simplified shim fabricating machine 20, wedge shaped shims can be fabricated in the following manner:

1. Block 34 is placed on table top 28 with one edge flush against table side 32 and the block is slid along the length of the table top through the rotating blades while maintaining the block flush against side 32 producing a block 34 as shown in FIG. 3 which has five cuts 50 therein parallel to each other and to the side of the block 34, said cuts 50 being just short of half the depth of the block 34.

Figure 4:
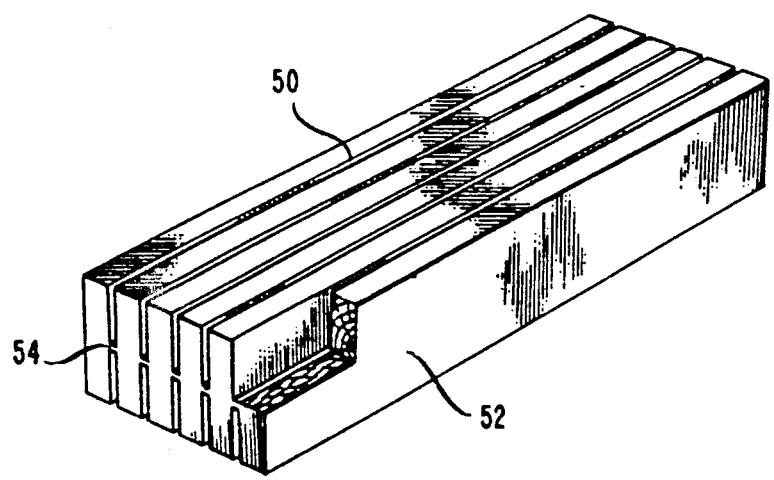
FIG. 4 is a perspective view of the shim block after the second pass through the machine of FIG. 1 and 2.

2. Block 34 is then flipped over and the process of step 1 above repeated producing stage two block 52 as shown in FIG. 4. Stage two block 52 has ten parallel cuts, five in one surface and five in the opposite surface, with the cuts in the opposite surfaces being directly above and below each other, said cuts being separated by a membrane of wood 54. The thickness of this membrane 54, controlled by setting the depth of the cut of the blades 24, is chosen so that it can be readily broken by simple finger pressure but is thick enough to retain the block in its original configuration. A preferred thickness is 1/16" but this can be varied to suit the particular type of wood being used.

Figure 5:
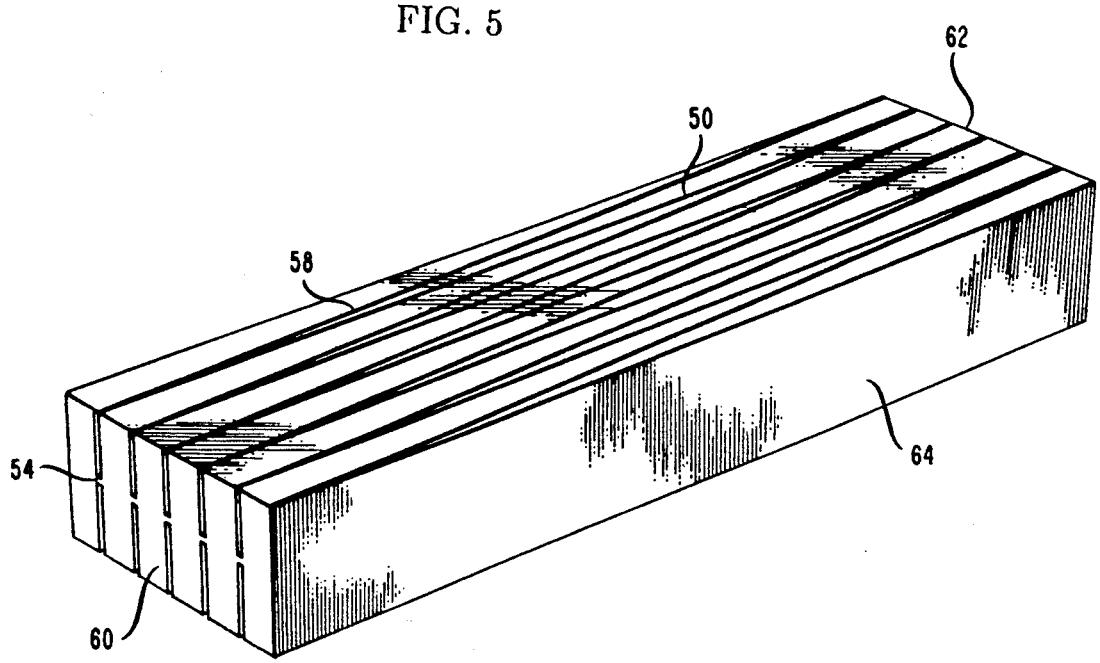
FIG. 5 is a perspective view of the shim block after the third pass through the machine of FIG. 1 and 2.
Figure 8:
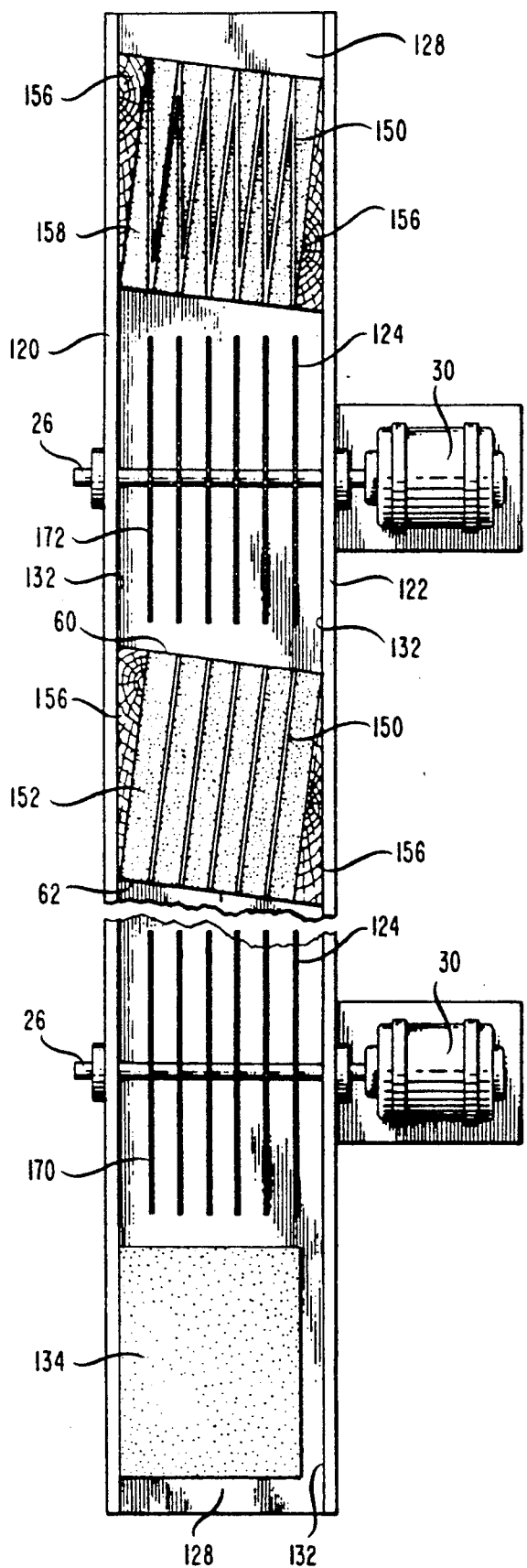
FIG. 8 is a top view of a portion of the machine of FIG. 7 showing three shim blocks in the process of being fabricated.

3. Stage two block 52 is once again placed on table top 28. However, instead of placing it parallel to table side 32 a tapered wedge 56 is placed between the edge of block 52 and table side 32 such that block 52 when passed through blades 24 will have cut therein six diagonal kerfs 58, said diagonal kerfs 58 running from the forward edge 60 of block 54 to the trailing edge 62 of block 54 dividing the space between the first set of parallel cuts into triangles. Block 54 before and after this operation is shown in FIGS. 5 and 8.

Figure 9:
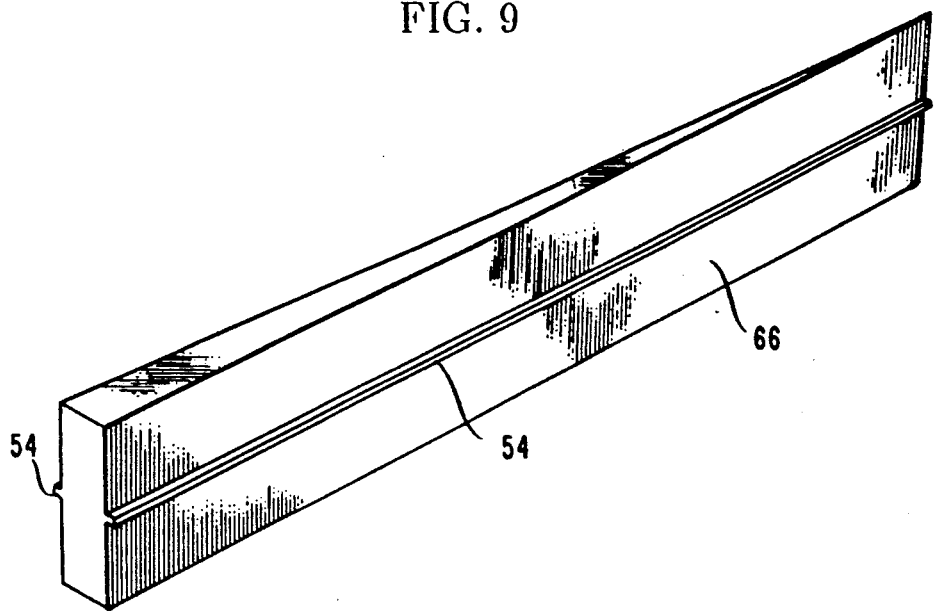
FIG. 9 is a perspective view of one of the shims seperated from the center of the shim block.

4. The block 52 emerging from step 3 above is then flipped over and the process of stage 3 repeated resulting in completed shim block 64 shown in FIG. 6. Shim block 64 is composed of 12 wedge shaped shims 66 held together by membrane 54. FIG. 9 shows one of the shims 66 separated from the center of shim block 64, the remainder of broken membrane 54 being visible thereon.

Figure 12:
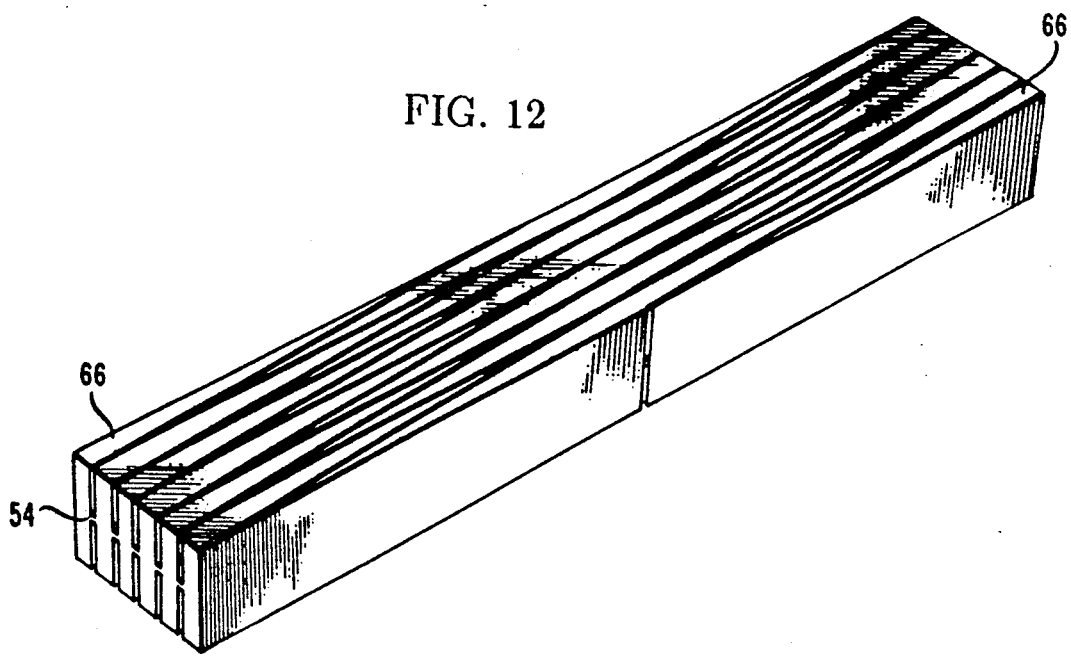
FIG. 12 is a top perspective view of a shim block with shims produced both side by side and end to end.

For simplicity fabrication of shim block 64 has been described as a series of four independent cutting steps performed through the use of six parallel rotating blades acting on a 12" long piece of standard 2 by 4. The invention includes the use of more then six parallel blades and pieces of wood wider then a standard 2 by 4 (wider the 3½") or several 2 by 4s placed side by side or end to end. FIG. 12 shows a shim block produced by the process of the invention starting from a 24" long 2 by 4.

Figure 6:
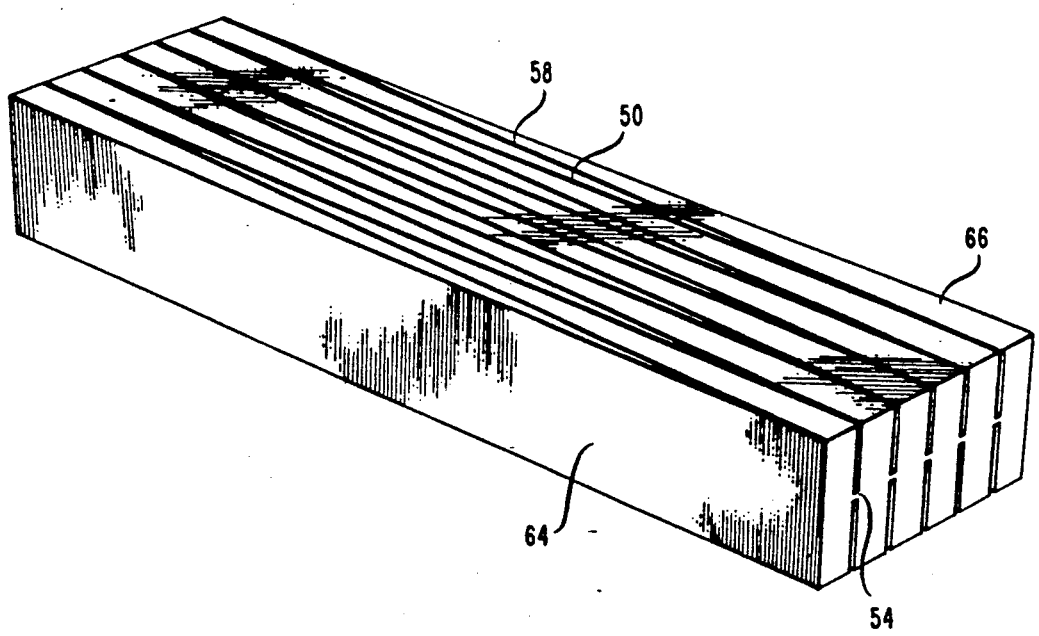
FIG. 6 is a perspective view of the shim block after the fourth pass through the machine of FIG. 1 and 2.
Figure 7:
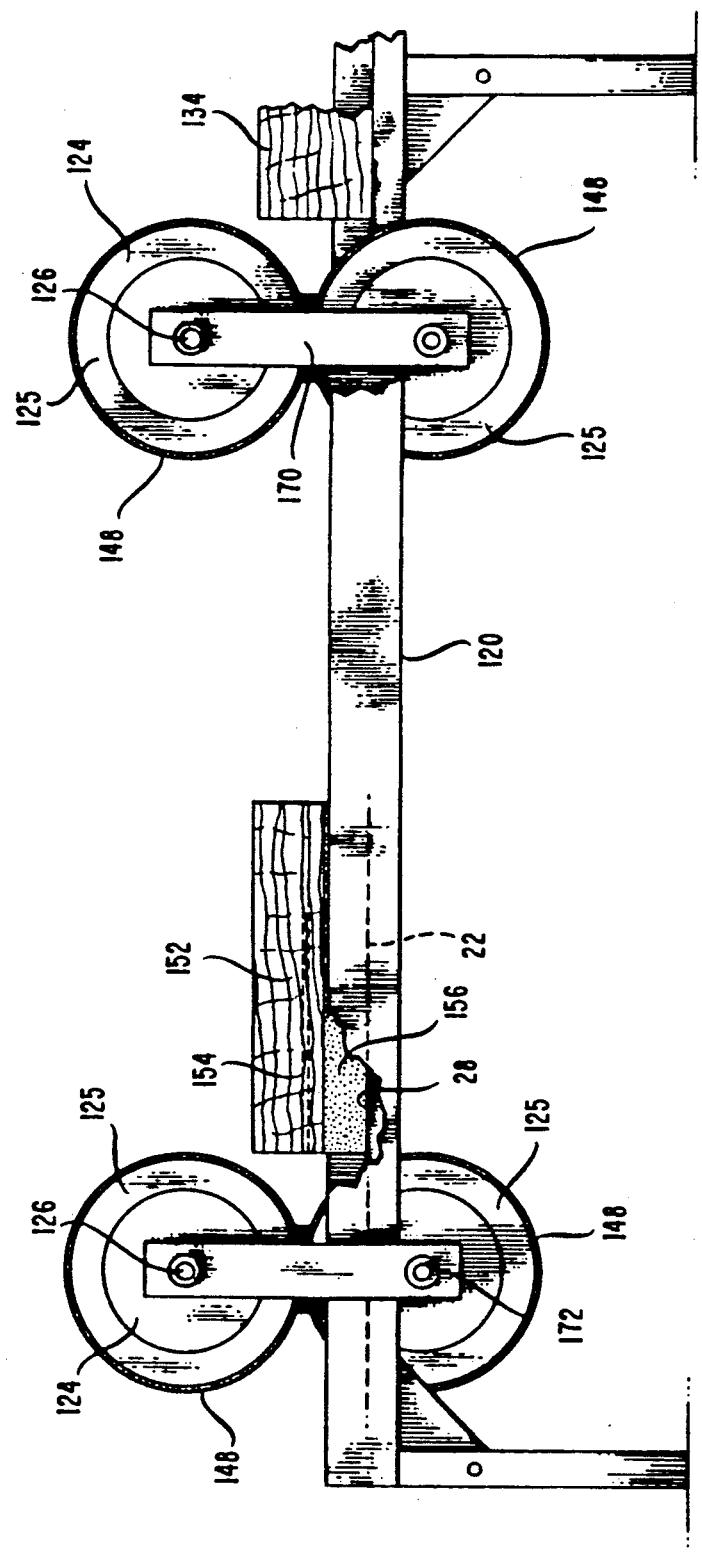
FIG. 7 is a partial cutaway side view of a preferred embodiment of the shim fabricating machine.

The preferred embodiment of the shim fabricating machine, referred to hereinafter as PSFM 120 and shown in FIG. 7 and 8, allows all of steps 1-4 above to be performed in one continuous operation. PSFM 120 is composed of a flat surfaced table 122 with four sets of parallel blades 124, 125 with the upper set of blades 124 mounted in the same manner and position as blades 24 described above. A second set of lower blades 125 are mounted within the table 122 such that the cutting edge 148 of the blades 125 is positioned a distance above the table top 128 just short of ½ the thickness of block 134. The lower blades 125 are further positioned so that they are parallel to and directly below the upper blades 124 with the distance between the cutting edges 148 of the upper and lower blades being equal to the chosen thickness of membrane 154. As shown in FIGS. 7 and 8, block 134, first placed to the right of the first set of rotating blades 170, is passed through said blades 170 producing a series of top and bottom parallel cuts, with block 152 emerging from said blades having the same appearance as the block 52 of FIG. 4. Once stage two block 152 fully emerges from the first set of blades 170 it is angled away from table sides 132 by a sliding tapered wedge 156 and the sliding wedge 156 and stage two block 152 are passed through the second set of blades 172 which simultaneously produce the diagonal cuts of stages 3 and 4 above. The resultant product, shown in FIG. 6 is the same as produced in the simplified embodiment described above.

Figure 10:
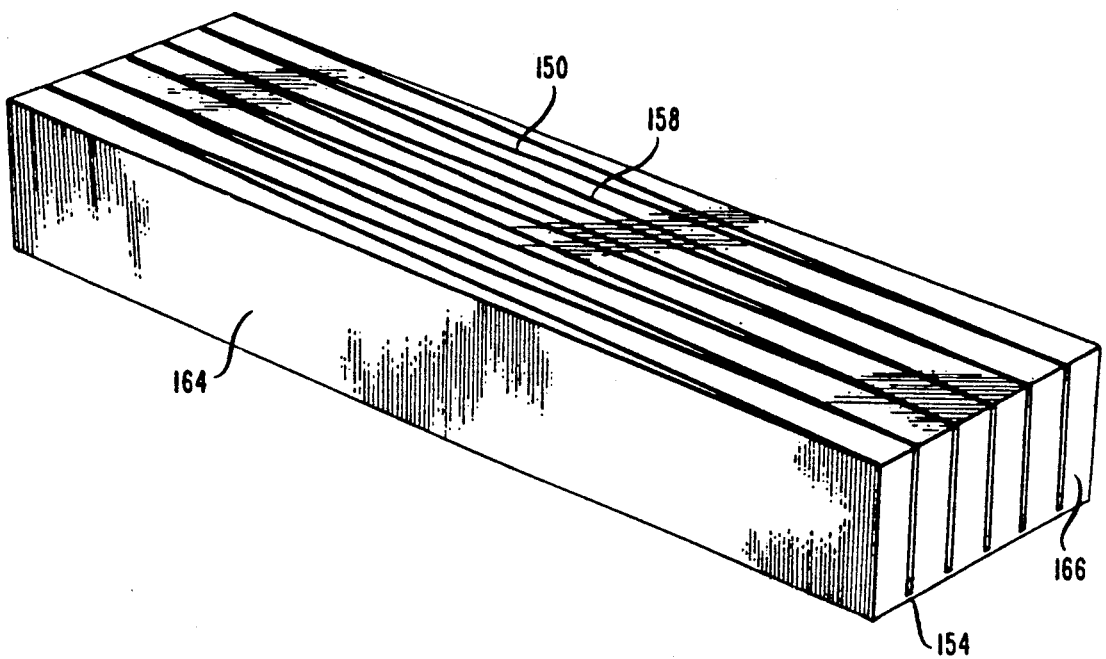
FIG. 10 is a perspective view of an additional embodiment where the blade cut is almost the full depth of the block.
Figure 11:
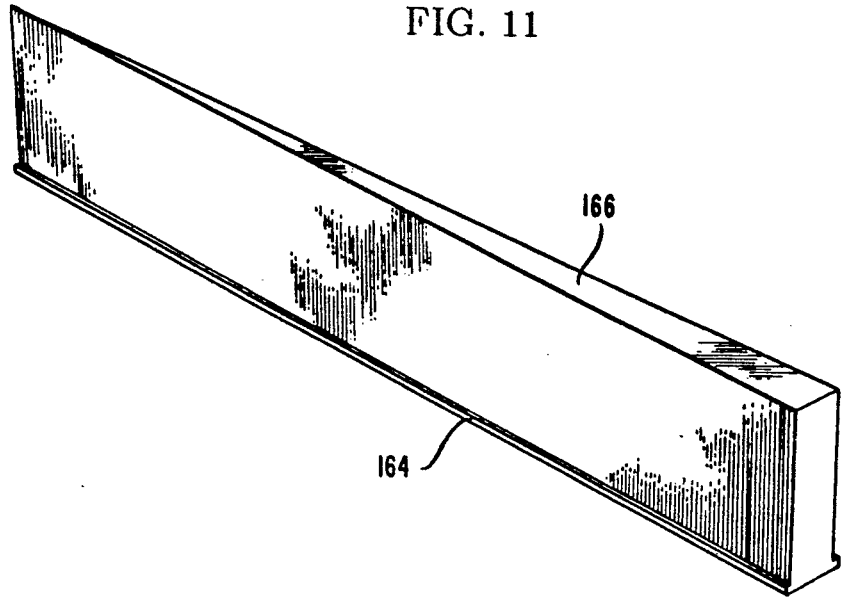
FIG. 11 is a perspective view of one of the shims separated from shim block with the membrane at the edge of the block.

In an additional embodiment the shim fabricating machine 20 is configured to make only two cuts, both cuts 150,158 being made from the same side of the block (either top or bottom) with the depth of the kerf produced by blades 36, 38, 40, 42 and 44 being slightly less than the thickness of the block 34 so that a membrane 54 is left at the outer edge of the block (FIG. 10 and 11).

In its preferred form the shim block 64, 164 is approximately 12" long, 3½" wide and 1½" thick. This block is made up of 12 shims 66, 166 each 12" long tapering from a thick edge of about 154" thickness to a very small or zero thickness at the opposite end. These tapered shims are held in the block configuration by a severable membrane of about 1/16" thickness. While these are preferred dimensions the invention contemplates shims of various lengths, widths, heights and taper.

While the above description sets forth two embodiments designed to perform each operation either serially as four separate steps or as one continuous operation the invention contemplates any combination, such as a serial two stage operation utilizing two sets of blades both mounted above the table to produce first a straight cut followed by a diagonal cut or two sets of blades one mounted above the table and one mounted within the table to produce first both straight cuts followed by a separate step to produce both sets of diagonal cuts. Also the dimensions set forth above are merely suggested dimensions. Any size block of wood can be cut utilizing suitably sized blades and the resultant dimensions and taper of the shim 66, 166 can be varied to suit various construction needs. Further the block can be sized by planing either before or after the cuts are made.

In addition, the shim fabricating machine can further include labeling and packaging equipment mounted on the exit thereof to automatically and continuously package the shim block in a manner suitable for storage, shipping and display of the shim block. Packaging in line has the added advantage of protecting the membrane 54, 154 within the shim block from breakage until the ultimate user desires to so separate the shim 66, 166 from the shim block 64, 164. Where the cut is made only from one side shrink wrap packaging of the shim block tends to cause the block to take on an curved rather than flat shape as there is more material on the uncut side of the block then the cut side. This can be prevented by placing an adhesively coated label against the cut side of the block prior to applying the wrapping material. The adhesive adhering the label to the wood surface is generally adequate to prevent the block width from being compressed under tension.

I claim:

1. A block of shims for use in the construction industry comprising multiple wedges formed from a single block of wood, said wedges each having a length significantly greater than the other dimensions of the wedges, each wedge being tapered along its length to a point at one end from a wider top at the other end each wedge further having its pointed end adjacent to the top end of each tapered wedge located on either side thereof, said wedges held in an integral structure of the same outer dimensions as the original block of wood, the wedges being joined to each other by a breakable wooden membrane between each adjacent wedge, said breakable wooden membrane extending the length of the wedges between the point and the wider top.

2. The block of shims of claim 1 having a first set of multiple parallel kerfs and a second set of multiple parallel kerfs, each kerf of the second set of multiple parallel kerfs intersecting the opposite ends of adjacent kerfs the first set of parallel kerfs.

3. The block of shims of claim 1 wherein the membranes are away from the edge of the block of wood.

4. The block of shims of claim 1 wherein the membranes are at the periphery of the block of wood.

5. The block of shims of claim 4 further comprising a adhesively backed label applied to the cut side of the block, said block and label enclosed in a protective covering.

6. A first wooden wedge attached to a second wooden wedge by an integral wooden membrane, each wedge having a first and a second triangular surface and three rectangular surfaces, the wood wedges separated by a rectangular kerf running the full length of the wedge spacing apart parallel rectangular surfaces of adjacent wedges, said kerf and membrane between the wedges running along the longest dimension of the wedges, the membrane contacting the first triangular surfaces of adjacent wedges, the first triangular surfaces being in the same plane.

7. A block of wood comprising a plurality of separable elongated shims separated by elongated kerfs and interconnected by a membrane, the shims when separated from the block being tapered along their length and being suitable for use as a construction aid,
   each shim having first and second opposed ends,
   each shim having a length which is greater than its width and thickness, each shim tapering along its length from a maximum thickness at the first end of the shim to a minimum thickness at the second end of the shim,
   each shim oriented so that its first end is adjacent to the second end of each adjacent shim and its second end is adjacent to the first end of each adjacent shim, and
   the kerfs penetrating only partially through the block to leave a breakable membrane between each adjacent shim, said kerf running along the length of the shim from the first end to the second end of adjacent shims.

8. A block of separable elongated shims comprising:
   at least four shims interconnected to each other by a membrane,
   the shim grouped into pairs of shim, each pair of shims being separated from the next adjacent pair of shims by a first kerf at an angle to the edge of the block and the shims within each pair of shims being separated by a second kerf intersecting the first kerf,
   the first and second kerf having a depth less than the thickness of the block to produce a membrane easily broken by simple hand pressure.

9. An improved package of multiple shims for use in the construction industry, each shim having a length significantly greater than the other dimensions of the shim, each shim being tapered along its length to a point at one end from a wider top at the other end, each shim further having its pointed end adjacent to the top end of each tapered shim located on either side thereof, wherein the improvement comprises:
   said shims joined in an integral structure, the shims being joined to each other by a single breakable wooden membrane between each adjacent shim, said breakable wooden membrane extending from the point to the wider top of the shim and being composed of the same material as the shim.

10. A wooden structure comprising multiple elongated duplicate pyramid-shaped blocks having five sides, the sides comprising a first and a second identical triangular side and a first, second and third rectangular side, the first and second triangular sides being parallel to each other and being separated by the first, second and third rectangular sides, the third rectangular side having two parallel edges of a length equal to the length of the shorter edge of the first parallel side the blocks attached to each other by a breakable membrane between an edge of the first triangular side of one block and the first triangular side of an adjacent block, said blocks having a length, width, and thickness the length being substantially greater than the width or thickness, the breakable membrane also extending along the length of the block and being composed of the same material as the block, said wooden structure being formed from a parallelepiped of wood having substantially all of the wood between adjacent blocks removed while leaving the membrane of wood at one surface of the parallelpiped.

11. The wooden structure of claim 10 wherein each block has a tapered thickness along its length from a first thick end to a second thin end, the thick end of each block in the structure being positioned next to the thin end of the block adjacent thereto.

* * * * *